No. 820,641. PATENTED MAY 15, 1906.
J. L. GLEASON.
PROTECTOR FOR INSULATORS.
APPLICATION FILED FEB. 17, 1904.
MODEL. 2 SHEETS—SHEET 1.
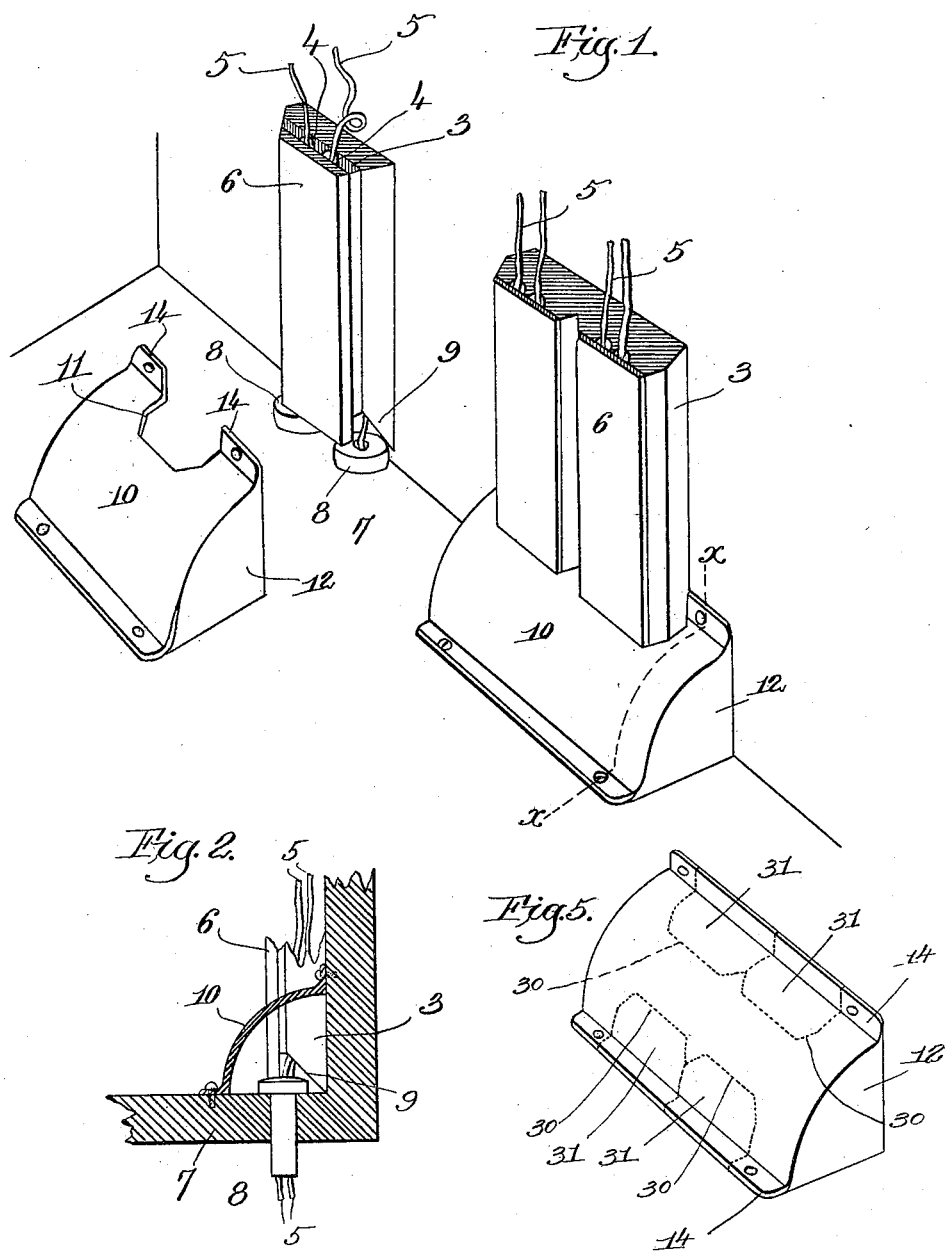

No. 820,641. PATENTED MAY 15, 1906.
J. L. GLEASON.
PROTECTOR FOR INSULATORS.
APPLICATION FILED FEB. 17, 1904.
MODEL.
2 SHEETS—SHEET 2.
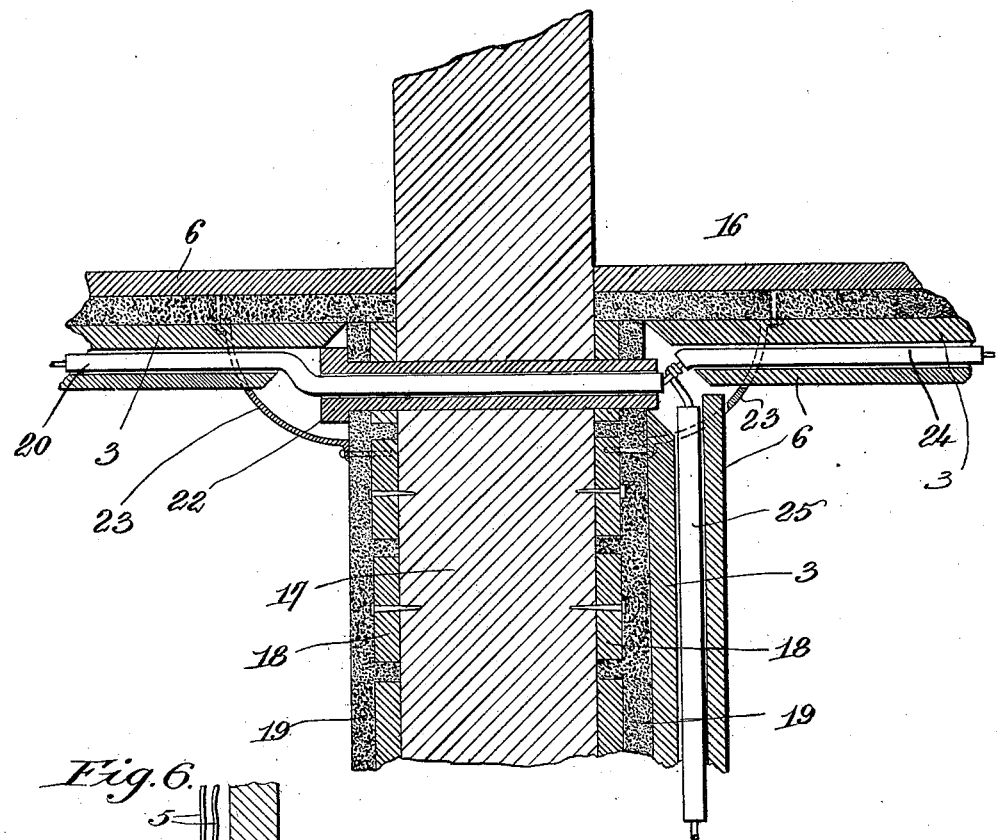
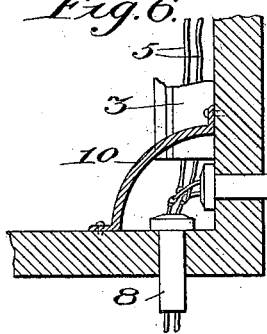
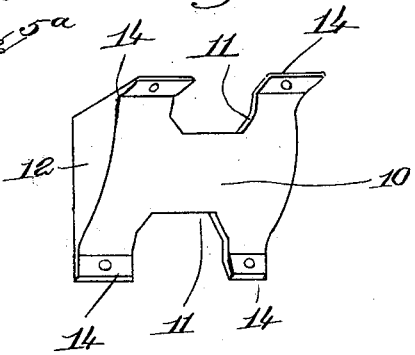
Witnesses.
Warren D. Owen
S. Wm. Lutton.
Inventor.
John L. Gleason,
by Densby Gregory,
Attys.

UNITED STATES PATENT OFFICE.

JOHN L. GLEASON, OF BOSTON, MASSACHUSETTS.

PROTECTOR FOR INSULATORS.

No. 820,641.  Specification of Letters Patent.  Patented May 15, 1906.

Application filed February 17, 1904. Serial No. 194,009. (Model.)

*To all whom it may concern:*

Be it known that I, JOHN L. GLEASON, a citizen of the United States, residing in Boston, in the county of Suffolk and State of Massachusetts, have invented an Improvement in Protectors for Insulators, of which the following description, in connection with the accompanying drawings, is a specification, like figures on the drawings representing like parts.

The present invention has for its object to provide a novel molding-box for use in the installation of an electric-wiring system in a building.

Where electric wires are placed in a building after it is finished, it is necessary to place them in suitable wooden moldings and to protect or insulate the wires by means of bushings of porcelain or other similar material where the wires pass through floors or walls in order to conform to the requirements of most boards of fire-underwriters. Heretofore it has been customary to cover the insulating-bushings either by the molding itself or by a suitable protecting device which incloses them; but no provision has been made for splicing or tapping the wires where they pass through a floor or ceiling, and as a result it has been necessary to conduct all the wires of the system to some outlet-box in order to connect the various branch circuits to the main wires. This of course often necessitates a good deal of extra wiring and extra labor.

In making my invention I have aimed to provide a novel device, which I have termed a "molding-box," which not only protects the insulating-bushings in the wall or floor through which the wires pass and provides a finish for the molding at the corner of the room, but also has the function of a junction-box in that it enables me to tap the wires at the point where they go through any wall or floor, and thus connect a branch wire directly to the main wire at any convenient place without the necessity of going clear to a remote outlet-box for accomplishing this purpose.

The form of molding-box which I prefer is one having a body portion constructed to extend across the angle between the wall and floor of a room or the wall and ceiling of a room, as the case may be, and having one or both sides cut away to fit around the molding in which the wires are placed, and it is also provided at each end with flanges which fit the angle of the room. A molding-box of this shape not only protects the insulating-bushings, as above stated, but also makes a neat finish to the molding-work and affords beneath itself sufficient room for making any necessary splices or taps in the wire and for covering the insulating-bushings which stand at an angle to each other, as those bushings which extend through a wall and a floor, respectively.

In the drawings, Figure 1 is a perspective view showing my improved device. Fig. 2 is a section on the line *x x*, Fig. 1. Fig. 3 is a section through a wall, showing my device applied as a junction-box. Fig. 4 is a perspective view of one form of my molding-box. Fig. 5 is a modification hereinafter referred to, and Fig. 6 shows still another way of using my improvement.

In wiring a building after completion it is customary to place the wires 5 in suitable moldings 3, such as shown in Fig. 1, said moldings being provided with grooves 4 to receive the wires and having covers 6, which close the grooves and conceal the wire. At the point where the wires are to pass through a floor or ceiling insulating bushings or tubes 8, of any suitable insulating material, are used, through which the wires pass, said tubes extending through the floors or walls, as shown in Figs. 1, 2, and 3, and thus insulating the wires.

In Figs. 1 and 2 I have shown the wires as extending through the floor only, and in Fig. 3 the wires are shown as extending through a wall and as being spliced at this point, and in Fig. 6 they are shown as extending through both the wall and the ceiling. The insulating-tube extending through the wall in Fig. 3 is designated by 22. To meet the requirements of the boards of fire-underwriters it is essential that these bushings 8 or 22 should be covered; but the covering heretofore used for them has not permitted of any splicing or tapping of the wires at the corners of the room. My improved molding-box permits such splicing or tapping of the wires and is therefore a combined junction-box and protector. The preferred form of box has the body portion 10, which is adapted to extend across the corner between the floor and wall or wall and ceiling and which is cut away, as at 11, to fit around the molding. Said device is also provided at its ends with flanges of a shape to fit the corner of the room, and the edges thereof are preferably formed with side flanges 14, adapted to rest against the wall and floor, respectively. These latter flanges are provided with apertures through which retaining-screws may be passed. I prefer to make the body portion 10 curved, so that the device presents a quarter of a cylindrical surface, although this particular shape is not essential to the invention.

Where the molding-box is used to cover the end of one line of molding, as shown in Fig. 1, said molding-box will be cut away on one side, as shown at 11, thereby permitting said molding-box to set into the corner of the room. It is sometimes extremely desirable to connect with the wires 5 at a corner of the room branch wires 5ª, thus saving the necessity of taking said branch wires to some remote outlet-box for connecting them to the main wires. My improved molding-box permits this to be done, as clearly seen in Fig. 6, wherein the wires 5 are tapped by the branch wires 5ª, which extend through the vertical wall, said wires 5ª also being protected by insulating-tubes 22. Because of the shape of the molding-box it affords beneath itself sufficient room to permit this tapping to be done and at the same time it serves as a protector and cover for the two bushings 8 and 22, which extend at an angle to each other and through different walls of the room.

In Fig. 3 the wire 20, which extends through the wall 17, is tapped and has connected thereto a branch wire 25, which extends down the wall of the room, the wire 24 extending along the ceiling. The wire 25 is shown as received in the molding 3, as usual. To cover the meeting ends of the moldings on the side and ceiling of the room, I propose to make the molding-box of a shape shown in Fig. 4, wherein both sides are cut away, as at 11, to fit around both of these moldings, which extend at an angle to each other. It will be observed that the body portion of my improved molding-box extends across the corner of the room, and the edges thereof fit against and are secured to the wall and ceiling or to the wall and floor, as the case may be, and that sufficient room is afforded beneath the molding-box to accommodate the splicing of the wires and also to cover insulating-bushings extending at an angle to each other.

Sometimes double molding-work is employed, as shown at the right in Fig. 1, and in such case I propose to make my molding-box with a long body portion having in its side double recesses to accommodate the double molding. By extending the length of the molding-box and providing the requisite number of recesses in its side said box can be made to accommodate any number of moldings placed side by side. It sometimes happens that before completing a job a workman cannot tell whether he will need for any particular location a molding-box having recesses in one side only, as shown in Fig. 1, or whether he will need one having recesses in opposite sides, as shown in Fig. 4. I propose, therefore, to make some molding-boxes without any recesses, but to make them in such a way that the portion of the metal where the recess is to be is so connected with the main body of the box that it can be broken out readily to make the required recess.

As shown in Fig. 5, the molding-box is formed during its process of manufacture with a line of weakness, (designated by dotted line 30,) so that by striking the portion 31, inclosed by said line of weakness, said portion can be broken out to form the recess. These "webbed" molding-boxes, as I call them, can be made with one or more webbed portions, as desired.

My improved molding-box may be cast from brass or any other suitable metal or may be stamped out of sheet metal or made in any suitable way.

Having described my invention, what I claim as new, and desire to secure by Letters Patent, is—

1. A molding-box presenting a body portion constructed to extend across the angle of two adjacent sides of a room and having one side cut away to fit around the molding in which wires are placed, said body portion having integral therewith at each end a flange to fit the angle of the room and affording beneath itself sufficient room to accommodate any splicing in the wires.

2. A molding-box for covering the ends of moldings and insulating-bushings inserted through walls and floors, said molding-box comprising a body portion constructed to extend across the corner of a room and having end flanges to fit said corner, said body portion being formed with lines of weakness inclosing a portion of the material thereof, whereby when said inclosed portion of material is struck, it is broken from the main body on the lines of weakness, thus forming a recess or recesses in the sides of the body portion to fit around the moldings.

3. A molding-box for electrical moldings comprising a curvilinear body portion having integral therewith at each end a quadrant-shaped end flange extending at right angles from the body portion, said body portion having a recess in one side, the contour of which is such as to fit the molding, and having apertured side flanges projecting from the longitudinal edges of the body portion, said side flanges standing at right angles to each other.

In testimony whereof I have signed my name to this specification in the presence of two subscribing witnesses.

JOHN L. GLEASON.

Witnesses:
 LOUIS C. SMITH,
 GEO. W. GREGORY.